(12) United States Patent
Rayes et al.

(10) Patent No.: US 7,234,163 B1
(45) Date of Patent: Jun. 19, 2007

(54) METHOD AND APPARATUS FOR PREVENTING SPOOFING OF NETWORK ADDRESSES

(75) Inventors: Ammar Rayes, San Ramon, CA (US); Michael Cheung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 10/244,996

(22) Filed: Sep. 16, 2002

(51) Int. Cl.
*G08B 23/00* (2006.01)

(52) U.S. Cl. .......................... 726/22; 726/25; 713/154

(58) Field of Classification Search ............ 726/11–13, 726/22–25; 709/223, 224, 220, 227; 370/401, 370/392, 229, 230, 497, 475, 395.52, 395.5, 370/351, 355; 713/151–154
See application file for complete search history.

(56) References Cited

U.S. PATENT DOCUMENTS

| | | | | |
|---|---|---|---|---|
| 5,978,373 A | * | 11/1999 | Hoff et al. ................... | 370/392 |
| 5,983,360 A | * | 11/1999 | Ugajin ........................ | 714/11 |
| 6,108,703 A | * | 8/2000 | Leighton et al. ............. | 709/226 |
| 6,256,314 B1 | * | 7/2001 | Rodrig et al. ............... | 370/401 |
| 6,393,484 B1 | | 5/2002 | Massarani | |
| 6,611,525 B1 | * | 8/2003 | Natanson et al. ...... | 370/395.53 |
| 6,618,398 B1 | * | 9/2003 | Marchetti et al. ........... | 370/475 |
| 6,633,761 B1 | * | 10/2003 | Singhal et al. .............. | 455/436 |
| 6,745,333 B1 | * | 6/2004 | Thomsen ..................... | 726/23 |
| 6,807,179 B1 | * | 10/2004 | Kanuri et al. ........... | 370/395.31 |
| 6,980,515 B1 | * | 12/2005 | Schunk et al. ........... | 370/230.1 |
| 2002/0013858 A1 | * | 1/2002 | Anderson ................... | 709/245 |
| 2002/0159459 A1 | * | 10/2002 | Nagatomo et al. .......... | 370/392 |
| 2003/0043853 A1 | * | 3/2003 | Doyle et al. ................ | 370/489 |
| 2003/0115344 A1 | * | 6/2003 | Tang et al. ................. | 709/229 |

FOREIGN PATENT DOCUMENTS

| | | |
|---|---|---|
| EP | 1 119 139 A2 | 7/2001 |
| EP | 1 170 925 A1 | 1/2002 |
| WO | WO 98/26530 A1 | 6/1998 |

OTHER PUBLICATIONS

David Plummer, "An Ethernet Address Resolution Protocol-or—Converting Network Protocol Addresses to 48.bit Ethernet Address for Transmission on Ethernet Hardware," Nov. 1982, http://www.ietf.org/rfc/rfc0826.txt?number826, printed Dec. 17, 2002, pp. 1-8.

R. Droms, "Dynamic Host Configuration Protocol," Bucknell University, Oct. 1993, http://www.cis.ohio-state.edu/cgi~bin/rfc/rfc1541.html, printed Dec. 17, 2002, pp. 1-31.

Rich Woundy, et al.., "DHCP Lease Query, <draft-ietf-dhc-leasequery-.03.txt>," Mar. 2002, Expires Sep. 2002, http://www.globecom.net/ietf/draft/draft-ietf-dhc-leasequery-03.html, printed Dec. 17, 2002, pp. 1-24.

(Continued)

*Primary Examiner*—Kim Vu
*Assistant Examiner*—Nirav Patel
(74) *Attorney, Agent, or Firm*—Hickman Palermo Truong & Becker LLP

(57) ABSTRACT

A method is disclosed for preventing spoofing of network addresses. A binding is established between an Internet Protocol (IP) address, a Media Access Control (MAC) address, and a port. An Address Resolution Protocol (ARP) table is updated based on the binding.

26 Claims, 6 Drawing Sheets

OTHER PUBLICATIONS

Sean Whalen, "An Introduction to Arp Spoofing," Apr. 2001, XP-002240206, 7 pages.

Written Opinion from PCT for foreign patent application No. PCT/US03/29308, dated Jun. 24, 2004 (6 pgs)—attached.

Current Claims in PCT patent application No. PCT/US03/29308 (5 pgs)—attached.

PCT International Preliminary Examination Report from foreign patent application No. PCT/US03/29308 dated Sep. 30, 2004 (7 pgs.)—attached.

\* cited by examiner

METHOD AND APPARATUS FOR PREVENTING SPOOFING OF NETWORK ADDRESSES

FIELD OF THE INVENTION

The present invention generally relates to computer network security. The invention relates more specifically to a method and apparatus for preventing spoofing of network addresses.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a data network that addresses data packets according to the Internet Protocol (IP) network layer protocol, each device within the network may be identified by an IP address. In a network that uses Ethernet as a data link layer, each device within the network may be identified by a Media Access Control (MAC) address.

In a network that uses IP over Ethernet, a network switch may maintain an Address Resolution Protocol (ARP) table that includes one or more mappings between IP addresses and MAC addresses. The ARP table is constrained to include at most one MAC address per a given IP address. If the network switch receives a data packet that is addressed to an IP address that maps to a MAC address of a device that is connected to the network switch, then the network switch delivers the data packet to that device.

If the network switch receives a data packet that includes an IP address that is not mapped to a MAC address that is in the ARP table, then the network switch broadcasts an ARP request within the network switch's broadcast domain. A reply to the ARP request means that some device has already been assigned the IP address. From the reply, the network switch knows the MAC address associated with the IP address. This association between the IP address and the MAC address is then stored as a mapping in the network switch's ARP table for future use. The switch then forwards the data packet to the MAC address. Alternatively, if there is no reply to the ARP request, then the network switch drops the data packet.

Using such mappings, network service providers attempt to ensure that those to whom data packets are not addressed do not receive those data packets. Additionally, network service providers use such mappings to attempt to limit network service to known subscribing devices.

A network switch may receive an ARP message, typically sent from a default gateway, which reveals a MAC address that is associated with a specified IP address. The network switch may update its ARP table to include a mapping between these addresses, replacing any existing mapping that includes the IP address.

A devious user can trick the network switch into including an illegitimate mapping in the network switch's ARP table. The user accomplishes this by conducting an ARP attack. To conduct an ARP attack, the user may send an ARP message to a network switch, computer, or network device that he wants to attack. The ARP message includes the user's device's MAC address and an IP address (possibly the IP address of the default gateway) that is already included in the ARP table. When the network switch receives the ARP message, the network switch ignorantly alters its ARP table to include the illegitimate mapping between the IP address and the user's device's MAC address. As a result, the devious user can receive packet traffic intended for another. The above technique may be referred to as "IP spoofing." Thereafter, the network switch incorrectly delivers, to the devious user's device, any data packets that are addressed to the IP address.

In addition, the devious user can attack the default gateway using the same technique. The devious user may prevent anyone from detecting this deception by instructing his device to forward data packets to the destination for which those data packets were actually intended. The security and privacy of the network are thereby compromised. The devious user may obtain important personal information such as bank account, credit card information, user account login and password, etc. Consequently, current and potential subscriber confidence is eroded. Furthermore, the devious user may use a similar technique to obtain network service while avoiding subscription. As a result, network service provider resources are depleted. Additionally, network activities of the devious user may be incorrectly imputed to someone who did not participate in those activities. Consequently, someone may be billed for services that he did not use. Moreover, a network service provider's legally required records may fail to reliably indicate, for each one of the network service provider's IP addresses, a user that is associated with that IP address.

Some approaches that attempt to prevent IP spoofing use a MAC address to identify a legitimate subscribing device. Such approaches attempt to prevent a legitimate IP address from being mapped to a MAC address that is not authoritatively associated with that IP address. Unfortunately, such approaches do not prevent a devious user from changing his device's MAC address to duplicate a MAC address that is legitimately associated with an IP address (i.e., "MAC address spoofing"). One popular operating system, Microsoft Windows 2000, provides a user with an interface that allows the user to alter the MAC address of the device that executes the operating system.

A theoretical approach to prevent network address spoofing could involve implementing more intelligent network switches. Unfortunately, such an approach would not avail network service providers that have already deployed numerous network switches that lack such intelligence. Replacing so many existing network switches may not be economical. Furthermore, until more intelligent network switches become available, such an approach remains strictly theoretical.

Another disadvantage to existing approaches that attempt to prevent network address spoofing is the limited action that these approaches take in response to detecting such spoofing. Typically, in response to detecting a spoofed network address, existing approaches do little else beyond dropping unrecognized packets. Thus, a devious user is not effectively deterred from future spoofing attempts (e.g., conducting additional ARP attacks).

Based on the foregoing, there is a clear need for an effective way to prevent the spoofing of MAC addresses and IP addresses with existing network switches.

BRIEF DESCRIPTION OF THE DRAWINGS

The present invention is illustrated by way of example, and not by way of limitation, in the figures of the accom panying drawings and in which like reference numerals refer to similar elements and in which.

DETAILED DESCRIPTION OF THE PREFERRED EMBODIMENT

A method and apparatus for preventing spoofing of network addresses is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method of Establishing a MAC-IP-Port Binding Relationship |
| | 3.1 Process of Preventing Spoofing of Network Addresses |
| | 3.2 Process of Generating and Sending a Notification |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for preventing spoofing of network addresses. A binding is established between an Internet Protocol (IP) address, a Media Access Control (MAC) address, and a port. An Address Resolution Protocol (ARP) table is updated based on the binding.

In other aspects, the invention encompasses a computer apparatus, a computer readable medium, and a carrier wave configured to carry out the foregoing steps.

2.0 Structural and Functional Overview

Figure 1:
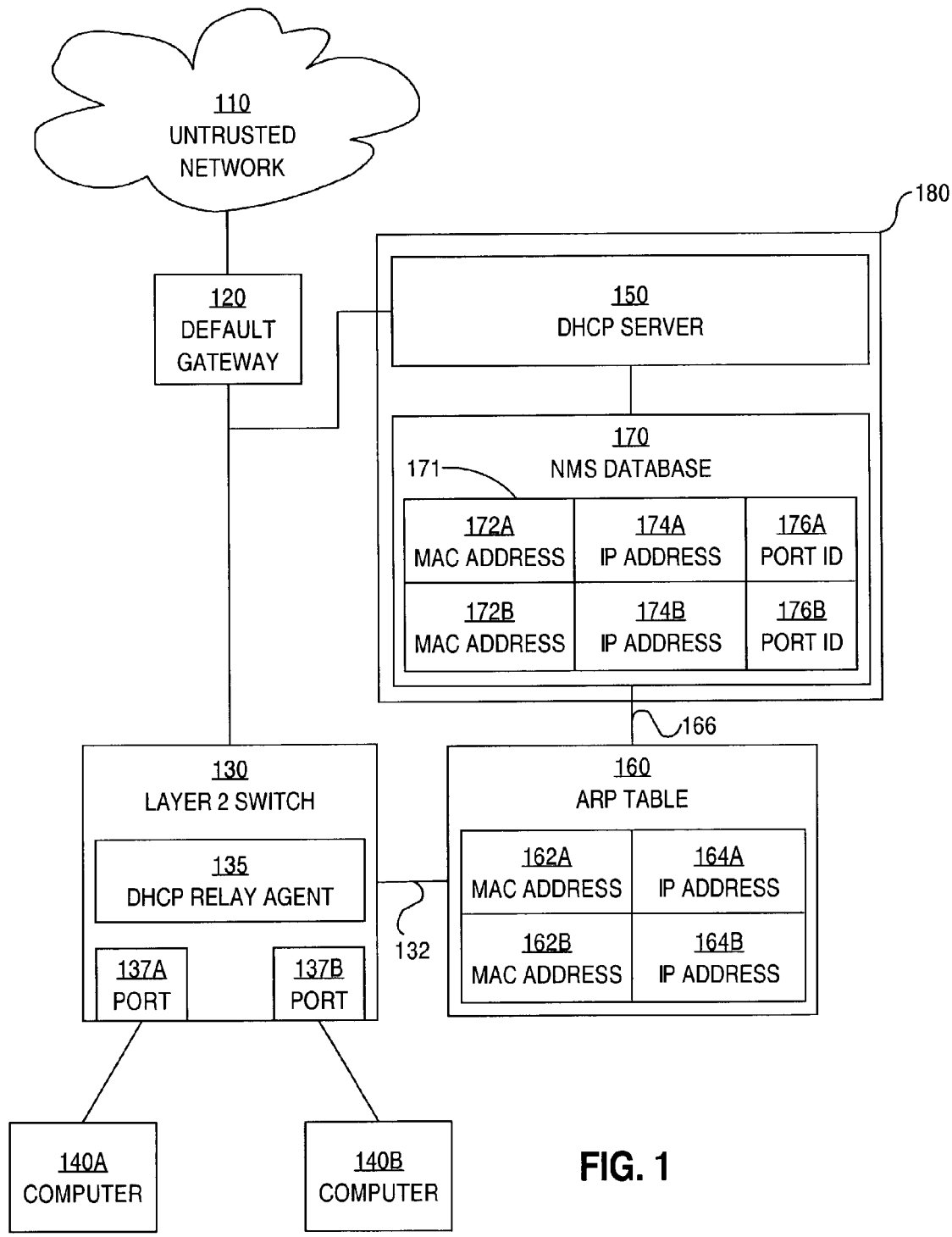
FIG. 1 is a block diagram that illustrates an overview of a system for preventing the spoofing of network addresses.

FIG. 1 is a block diagram that illustrates an overview of a system for preventing the spoofing of network addresses. The system includes an untrusted network 110, a default gateway 120, a layer 2 switch 130, computers 140A–140B, an ARP table 160, and a Network Management System (NMS) 180. Layer 2 switch 130 includes a Dynamic Host Configuration Protocol (DHCP) relay agent 135 and ports 137A–137B. Layer 2 switch 130 may also include ARP table 160. NMS 180 includes a DHCP server 150 and an NMS database 170.

Untrusted network 110 is connected to default gateway 120. Default gateway 120 is connected, directly or indirectly through a network, to DHCP server 150. Default gateway 120 is also connected, possibly through a network, to layer 2 switch 130. Computer 140A is connected to layer 2 switch 130 through port 137A. Computer 140B is connected to layer 2 switch 130 through port 137B. Computers 140A–140B may comprise any network devices, such as routers, personal computers, workstations, or other hosts.

Layer 2 switch 130 interfaces with ARP table 160 via link 132. NMS database 170 also interfaces with ARP table 160 via virtual link 166. NMS database 170 also interfaces with DHCP server 150.

Each of computers 140A–140B may be capable of obtaining an IP address through a DHCP request. Layer 2 switch 130 may be capable of receiving a DHCP request over one of ports 137A–137B. Layer 2 switch 130 may also be capable of forwarding a DHCP request. DHCP relay agent 135 may be capable of identifying a port from which a DHCP request is received. DHCP server 150 may be capable of receiving a DHCP request. DHCP server 150 may also be capable of assigning an IP address.

For purposes of illustrating a simple example, FIG. 1 shows two computers and one of each other principal element. However, in a practical system, there may be any number of such computers and elements. ARP table 160 is an information repository that identifies devices that are communicating with a network through layer 2 switch 130. ARP table 160 may include an entry (e.g., a row) for each of computers 140A–140B. ARP table 160 may also include an entry for default gateway 120. Each entry includes a MAC address and an IP address associated with that MAC address. Entries in the ARP table may be created based upon responses to ARP requests that layer 2 switch 130 broadcasts within a broadcast domain.

A MAC address 162A may be a MAC address of a network interface device (e.g., a network interface card) of computer 140A. A MAC address 162B may be a MAC address of a network interface device of computer 140B. An IP address 164A may be an IP address of a network interface device of computer 140A. An IP address 164B may be an IP address of a network interface device of computer 140B.

NMS 180 may be capable of obtaining a MAC address, an IP address, and a port ID from a DHCP request or some other source, such as a network inventory system database. NMS 180 may also be capable of recording bindings, between network addresses and ports, in NMS database 170. While NMS database 170 is shown included in NMS 180, NMS 180 may be capable of recording bindings in any database, including a database that is not part of NMS 180. Additionally, NMS 180 may be capable of updating ARP table 160 based on NMS database 170. NMS 180 may be capable of generating notifications. NMS 180 may also be capable of instructing (e.g., through command messages) layer 2 switch 130 and computers 140A–140B to perform specified operations.

NMS database 170 may comprise a mapping 171 that includes an entry (e.g., a record) for each of computers 140A–140B. Mapping 171 of NMS database 170 may also include an entry for default gateway 120. Each entry may include a MAC address, an IP address associated with that MAC address, and a port identifier (ID) of a switch port coupled to a device associated with that MAC address and IP address. For example, a MAC address 172A may be a MAC address of a network interface device of computer 140A. A MAC address 172B may be a MAC address of a network interface device of computer 140B. An IP address 174A may be an IP address of a network interface device of computer 140A. An IP address 174B may be an IP address of a network interface device of computer 140B. A port ID 176A may be an identifier of port 137A. A port ID 176B may be an identifier of port 137B. Thus, each entry in mapping 171 may include a binding between a MAC address, an IP address, and a port ID.

Viewed from one perspective, a MAC address and an IP address may be combined to form a single identifier of a device within a network. A MAC address and an IP address also each separately identify a device within a network.

A port and its corresponding port ID also identify a device within a network, at least in relation to a network switch through which that device communicates with the network. Because no more than one device may be physically connected at one time to a given port of a network switch, a port ID identifies a unique relationship between a device and the network switch through which the device communicates with a network. When data packets (e.g., ARP messages) are sent or received through a port, they are sent or received in relation to a certain port ID. Thus, a port ID is a unique characteristic of a device that communicates through a network switch. Because the connection between a device and a port is a physical connection, and because a user of the device cannot control a network switch, the port ID, unlike an IP address or a MAC address, cannot be changed through the device.

3.0 Method of Establishing a Mac-IP-Port Binding Relationship

Figure 2:
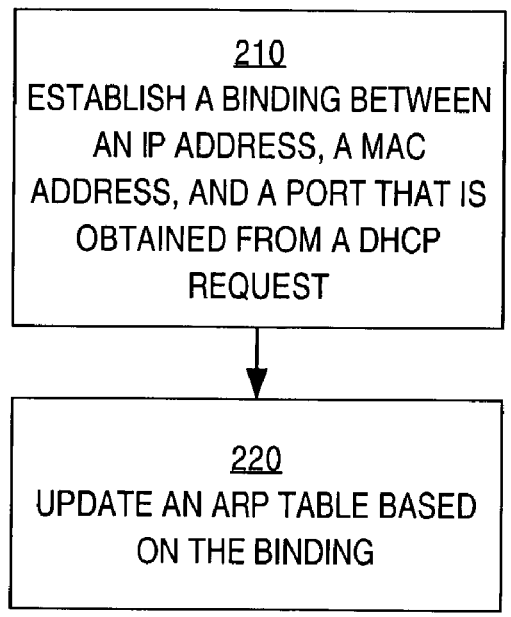
FIG. 2 is a flow diagram that illustrates a high layer overview of one embodiment of a method for preventing the spoofing of network addresses.

FIG. 2 is a flow diagram that illustrates a high layer overview of one embodiment of a method for preventing the spoofing of network addresses. In block 210, a binding is established between an IP address, a MAC address, and a port that is obtained from a DHCP request. For example, in one embodiment, computer 140A obtains an IP address by making a DHCP request. The DHCP request includes a MAC address 172A of the network interface device of computer 140A. Layer 2 switch 130 receives the DHCP request on port 137A. DHCP relay agent 135, using DHCP Relay "82," identifies port 137A as the port from which layer 2 switch 130 received the DHCP request. DHCP relay agent 135 adds a port ID 176A, which identifies port 137A, to the DHCP request. Layer 2 switch 130 forwards the DHCP request to DHCP server 150. In response to the DHCP request, DHCP server 150 assigns an IP address 174A to the network interface device of computer 140A. NMS 180, of which DHCP server 150 is a component part, obtains MAC address 172A, IP address 174A, and port ID 176A from the DHCP request. NMS 180 records, in NMS database 170, a binding between MAC address 172A, IP address 174A, and port ID 176A.

In block 220, an ARP table is updated based on the binding established in block 210. For example, NMS 180 may update ARP table 160 based on the binding between MAC address 172A, IP address 174A, and port ID 176A. The update may be performed by NMS 180 sending an ARP message, containing MAC address 172A and IP address 174A, to layer 2 switch 130. As a result, ARP table 160 includes an association between MAC address 162A and IP address 164A, where MAC address 162A is equal to MAC address 172A, and IP address 164A is equal to IP address 174A. ARP table 160 does not need to be capable of storing port ID 176A. Therefore, layer 2 switch 130 needs not have an ARP table that is capable of storing a port ID. Consequently, one of many existing network switches may be used as layer 2 switch 130. An example is a Catalyst 4000 switch from Cisco Systems, Inc.

Figure 3:
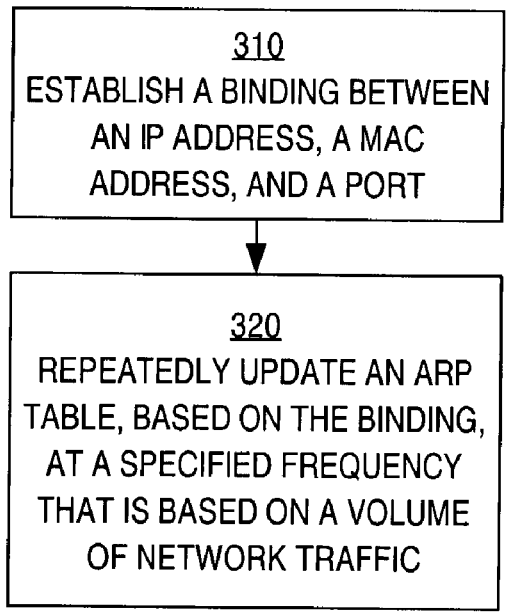
FIG. 3 is a flow diagram that illustrates a high layer overview of an alternative embodiment of a method for preventing the spoofing of network addresses.

FIG. 3 is a flow diagram that illustrates a high layer overview of an alternative embodiment of a method for preventing the spoofing of network addresses. In this alternative embodiment, DHCP relay agent 135 does not need to include port ID 176A in the DHCP request. NMS 180 does not need to obtain MAC address 172A, IP address 174A, and port ID 176A from the DHCP request. Instead, NMS 180 may obtain MAC address 172A, IP address 174A, and port ID 176A from another source, as is described below.

In block 310, a binding is established between an IP address, a MAC address, and a port. For example, during a registration period, NMS 180 may discover MAC addresses 172A and 174A from an original DHCP request, and at the same time, a user's postal address may be recorded. Port IDs 176A and 176B may be obtained by querying a network inventory database that stores a mapping between a physical postal address and a port ID (i.e., an identifier of a port that is connected to a device that is located at a postal address). The network inventory database may be populated during initial network installation, and may be a subsystem of NMS 180. As a result, a port ID that is associated with a new network subscriber is known and may be inserted, with the MAC-EP mapping, into a database, such as NMS database 170, that stores MAC-EP-port bindings.

In block 320, an ARP table is repeatedly updated, based on the binding, at a specified frequency. For example, NMS 180 may update every mapping in ARP table 160 every minute based on bindings in NMS database 170. Because NMS 180 is capable of updating ARP table 160, a network switch that includes ARP table 160 does not need to include intelligence that is capable of querying NMS database 170. In essence, NMS 180 holds authoritative, non-spoofable bindings and can confidently overwrite MAC-IP address bindings in ARP table 160 periodically. As a result, one of many existing network switches may be used as layer 2 switch 130. In one embodiment, the specified frequency is based on a volume of network traffic. For example, NMS 180 could update ARP table 160 every time that a predetermined number of ARP messages are received by layer 2 switch 130.

The embodiments described above with reference to FIG. 2 and FIG. 3 each incorporate a technique for establishing a binding between an IP address, a MAC address, and a port. The embodiments described above also each incorporate a technique for updating an ARP table. While the embodiments described above may involve certain combinations of these techniques, other embodiments of the invention may involve other combinations of these techniques. In other words, there is no limitation on which technique for establishing a binding can be used in conjunction with a selected technique for updating an ARP table; these techniques are independent of each other.

A binding between a MAC address and an IP address may be obtained from a DHCP request. To associate such a binding with a specific port, the port may be discovered in any of several ways. For example, the port may be discovered by leveraging Option "82" capability in a network switch. For another example, the port may be discovered from a network inventory database that is populated during a registration period. For yet another example, a User Registration Tool (URT) server, available from Cisco Systems, may provide port information to a network switch that has been configured to communicate with the URT server.

An NMS, such as NMS 180, may update an ARP table, such as ARP table 160, after every DHCP transaction that results in a new binding between an IP address and a MAC address (e.g., whenever a computer such as computer 140A or computer 140B is assigned an IP address). In various embodiments, an NMS may additionally update an ARP table at other times or upon the occurrence of other events. For example, an NMS may update, based on a database that includes the MAC-IP-port bindings described above, an ARP table at a specified time frequency (e.g., every "t" seconds). For another example, a network switch, such as layer 2 switch 130, may actively synchronize with such a database. More specifically, a network switch may synchronize with a database at a specified frequency. The frequency of synchronization may be a predetermined period of time (e.g., every "t" seconds). A network switch may synchronize with a database whenever a specified number of ARP packets pass through the network switch since a previous synchronization, or whenever the network switch receives an ARP packet. The schemes that may possibly be used for determining a frequency of synchronization between a database and an ARP table are not exhaustively listed herein. More or less intelligence may be incorporated into a network switch as needed to enable a selected scheme.

In either of the embodiments described above, additional measures, engineered to prevent the spoofing of network addresses, may be taken in addition to the updating performed in block 220. Some of these measures are described in greater detail below.

3.1 Process of Preventing Spoofing of Network Address

Figure 4A:
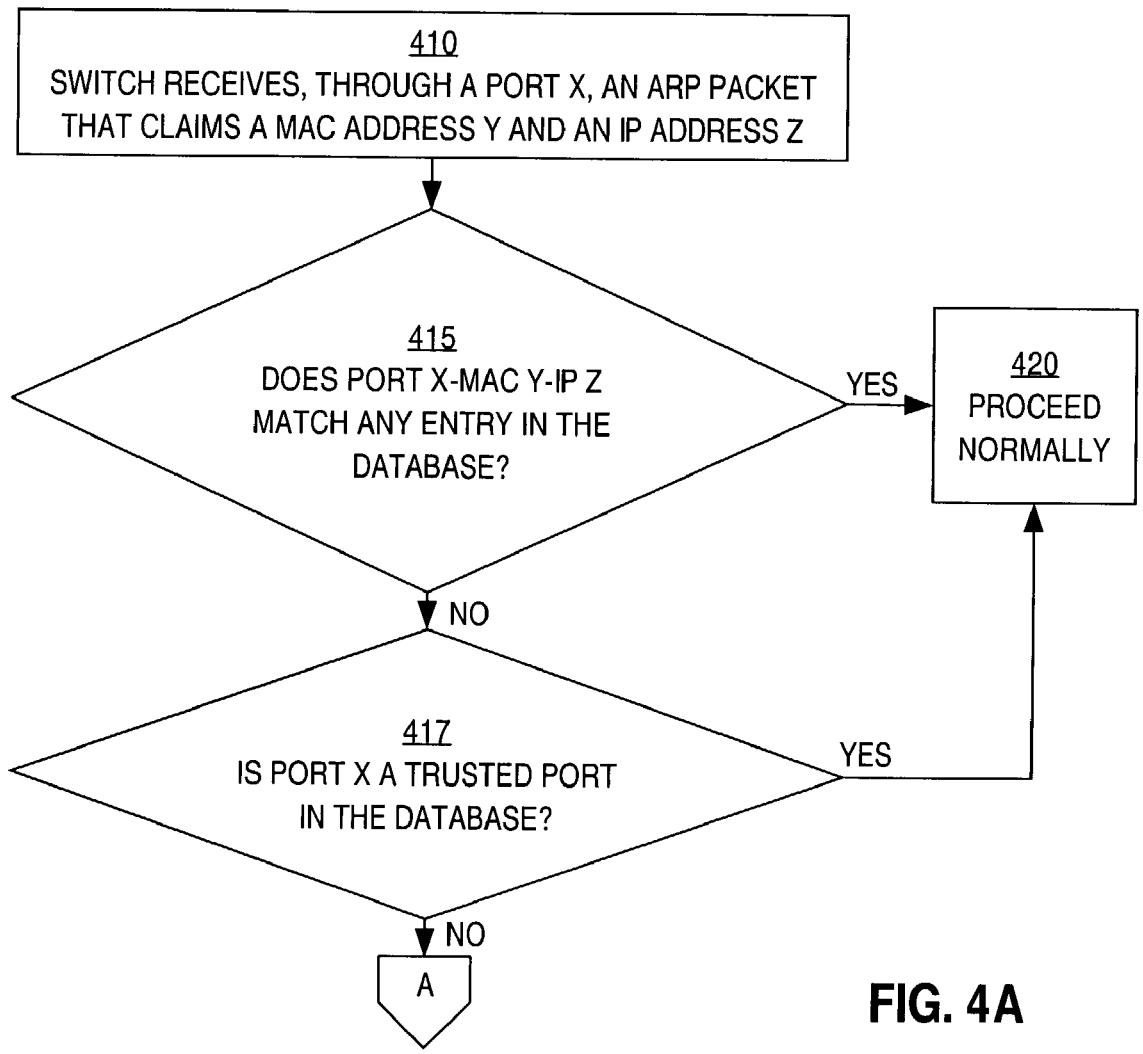
FIG. 4A, FIG. 4B, and FIG. 4C are flow diagrams that illustrate one embodiment of a process for updating an ARP table and generating a notification.
Figure 4B:
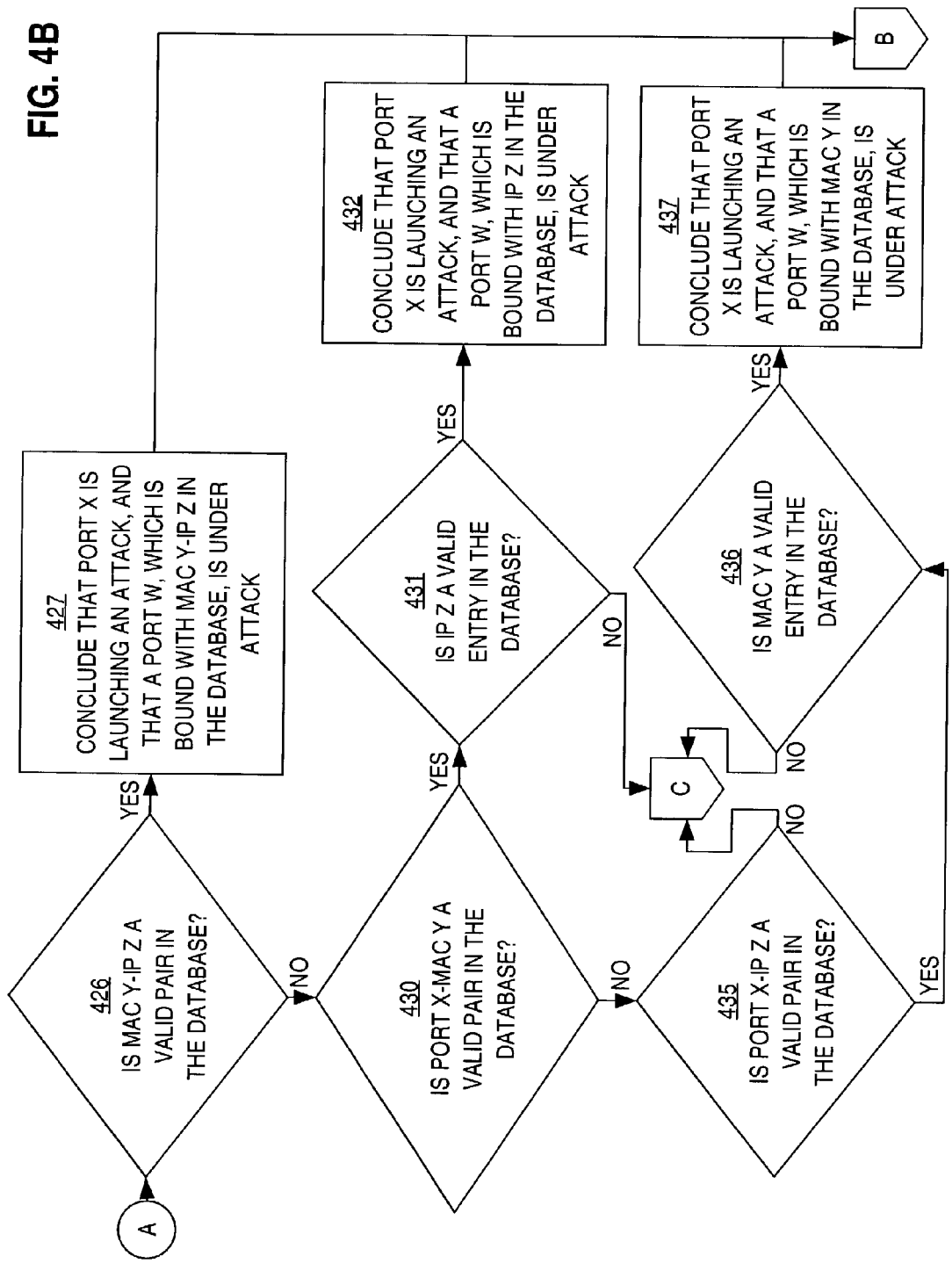
Figure 4C:
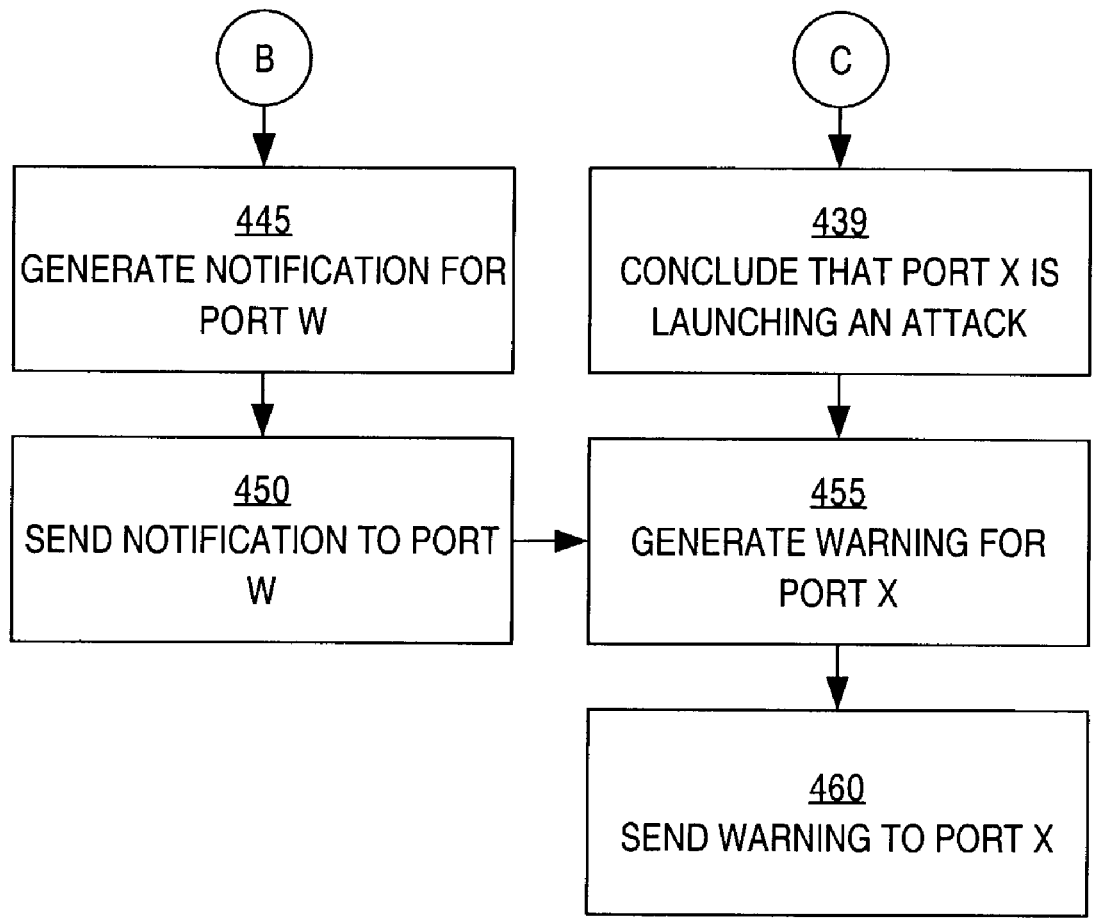

FIG. 4A, FIG. 4B, and FIG. 4C are flow diagrams that illustrate one embodiment of a process for updating an ARP table and generating a notification. For purposes of illustrating an example, hypothetical addresses and port values are used. In the following example, it is assumed that NMS database 170, which may be included in NMS 180 or in layer 2 switch 130, includes bindings such as port 137A-MAC 162A-IP 164A and port 137B-MAC162B-IP 164B.

In block 410, an ARP packet, that claims a MAC address Y and an IP address Z, is received through a port X of a network switch. The ARP packet therefore claims a binding port X-MAC Y-IP Z. The port X is used to spoof a network address of a device having the IP address Z and/or the MAC address Y. For example, layer 2 switch 130 may receive, from computer 140B through port 137B, an ARP message that includes MAC address 162A and IP address 164A, both of which are legitimately assigned to computer 140A and not computer 140B.

How a network address is protected against spoofing depends on how an ARP table is updated, as described above. If an NMS updates the ARP table on a predetermined, regular basis, then, when an illegitimate ARP packet arrives, the network switch updates an ARP table with the false MAC-IP binding. When the NMS next synchronizes with the ARP table, the illegitimate binding is detected by the NMS. Based on the illegitimate binding and the legal binding in the MAC-IP-PORT database, NMS will be able to determine which network entity is being attacked and from which network entity the attack originates. Appropriate action can be taken. The false ARP entry may be replaced by a legitimate ARP entry from the NMS database.

If a network switch actively synchronizes an ARP table with a MAC-IP-port database on a pre-defined regular basis, then the network address may be protected in the same manner.

If a network switch checks every incoming ARP packet against a MAC-IP-port database and then synchronizes an ARP table with the database, then, when an ARP packet arrives, the network switch may obtain the MAC-IP binding relationship from the ARP packet content. Based on the port through which the ARP packed was received, the network switch may establish the MAC-IP-port binding relationship of the ARP packet. The switch may then check the ARP packet's MAC-IP-port binding relationship against the relationships in the database. The NMS may then determine if the ARP packet's binding relationship is legitimate. For example, a MAC-IP=162A-IP_Gateway binding will be caught as being illegitimate. For another example, a 162A-164A-137B binding will also be caught as being illegitimate even though the 162A-164A binding is legitimate according to the ARP table used by the network switch. If the binding is legitimate, then the NMS will allow the ARP packet to proceed. NMS may also update the database and direct the network switch to update an ARP table appropriately. If the binding is illegitimate, then the NMS will detect the network entity that is under attack. The NMS will also detect the network entity from which the attack originated. Appropriate action can then be taken.

In block 415, it is determined whether the port X-MAC Y-IP Z binding matches any entry in a specified database, such as NMS database 170. In essence, the port X-MAC Y-IP Z binding is a combination that is compared with each combination (i.e., binding) in the database. If a match is found, then control passes to block 420. If a match is not found, then control passes to block 417.

In block 417, it is determined whether port X is a trusted port in the database. For example, there may be a dedicated port, such as port 0, for a network administrator. This dedicated port is a trusted port. If port X is a trusted port, then control passes to block 420. If port X is not a trusted port, then an attack is originating from port X, and control passes to block 426 of FIG. 4B.

In block 420, the system proceeds normally.

Referring to FIG. 4B, in block 426, it is determined whether MAC Y-IP Z is a valid pair in the database. If MAC Y-IP Z is a valid pair in the database, then control passes to block 427. If MAC Y-IP Z is not a valid pair in the database, then control passes to block 430.

In block 427, it is concluded that port X is launching an attack, and that a port W, which is included in a binding with MAC Y-IP Z in the database, is under attack. Control then passes to block 445 of FIG. 4C.

In block 430, it is determined whether port X-MAC Y is a valid pair in the database. If port X-MAC Y is a valid pair in the database, then control passes to block 431. If port X-MAC Y is not a valid pair in the database, then control passes to block 435.

In block 431, it is determined whether IP Z is a valid entry in the database. If IP Z is a valid entry in the database, then control passes to block 432. If IP Z is not a valid entry in the database, then control passes to block 439 of FIG. 4C.

In block 432, it is concluded that port X is launching an attack, and that a port W, which is included in a binding with IP Z in the database, is under attack. Control then passes to block 445 of FIG. 4C.

In block 435, it is determined whether port X-IP Z is a valid pair in the database. If port X-IP Z is a valid pair in the database, then control passes to block 436. If port X-IP Z is not a valid pair in the database, then control passes to block 439 of FIG. 4C.

In block 436, it is determined whether MAC Y is a valid entry in the database. If MAC Y is a valid entry in the database, then control passes to block 437. If MAC Y is not a valid entry in the database, then control passes to block 439 of FIG. 4C.

In block 437, it is concluded that port X is launching an attack, and that a port W, which is included in a binding with MAC Y in the database, is under attack. Control then passes to block 445 of FIG. 4C.

3.2 Process of Generating and Sending a Notification

Referring to FIG. 4C, in block 445, a notification is generated for port W. For example, the notification may warn a user that his network address has been used by another device. In block 450, the notification is sent to port W.

In block 439, it is concluded that port X is launching an attack. In block 455, a warning is generated for port X. For example, the warning may warn a user, if the user is spoofing a network address, that the user's activities are being monitored and that those activities will be restricted. The details of the warning may be customized. Viewed from one perspective, the warning itself is a notification. In block 460, the warning is sent to port X.

For yet another example, a notification may alert a network system administrator (e.g., a user with administrator privileges in NMS 180) about the network address and port that is being spoofed, and about the port through which the network address is being spoofed (i.e., port X). The network administrator may prompt a user to obtain a new IP address. The network administrator may also disable port X. In any of these examples, NMS 180 may generate the notification. The notification may be presented on a computer display. The notification may be logged in a computer file.

In one embodiment, communication to port X is interrupted. For example, NMS 180 may instruct (e.g., through a command message) layer 2 switch 130 to stop sending or receiving packets on port 137B. Thus, a devious user, who spoofs an IP address and MAC address that are associated with a legitimate device, is prevented from sending or receiving packets on the port to which his device is connected, even if ARP table 160 includes an association between the spoofed IP and MAC addresses. Communication to a port may be interrupted automatically upon NMS 180 determining that the port is being abused. Such automatic interruption may be performed after a predetermined number of warnings have been issued. A network system administrator who has been notified of such abuse may responsively instruct NMS 180 to interrupt communication to the abused port.

In one embodiment, an IP address, that is different from IP address Z (which has been spoofed), is assigned to a device that is connected to a port that is included in a binding that includes IP address Z. In other words, a new and different IP address is assigned to the computer that is legitimately associated, in NMS database 170, with a spoofed IP address. For example, NMS 180 (including DHCP server 150) may instruct computer 140A (e.g., through a command message) to change its IP address. This change is also reflected in the corresponding binding within NMS database 170. The change may occur automatically whenever NMS 180 detects a spoofed network address. A network system administrator may cause the change in response to being notified that a network address has been spoofed. Thus, potentially illegitimate network activity that is related to the spoofed network address will not thereafter be incorrectly imputed to the former, legitimate user of that network address. Furthermore, legally required records maintained by a network service provider will accurately represent associations between network addresses and the users of those network addresses.

4.0 Implementation Mechanisms—Hardware Overview

Figure 5:
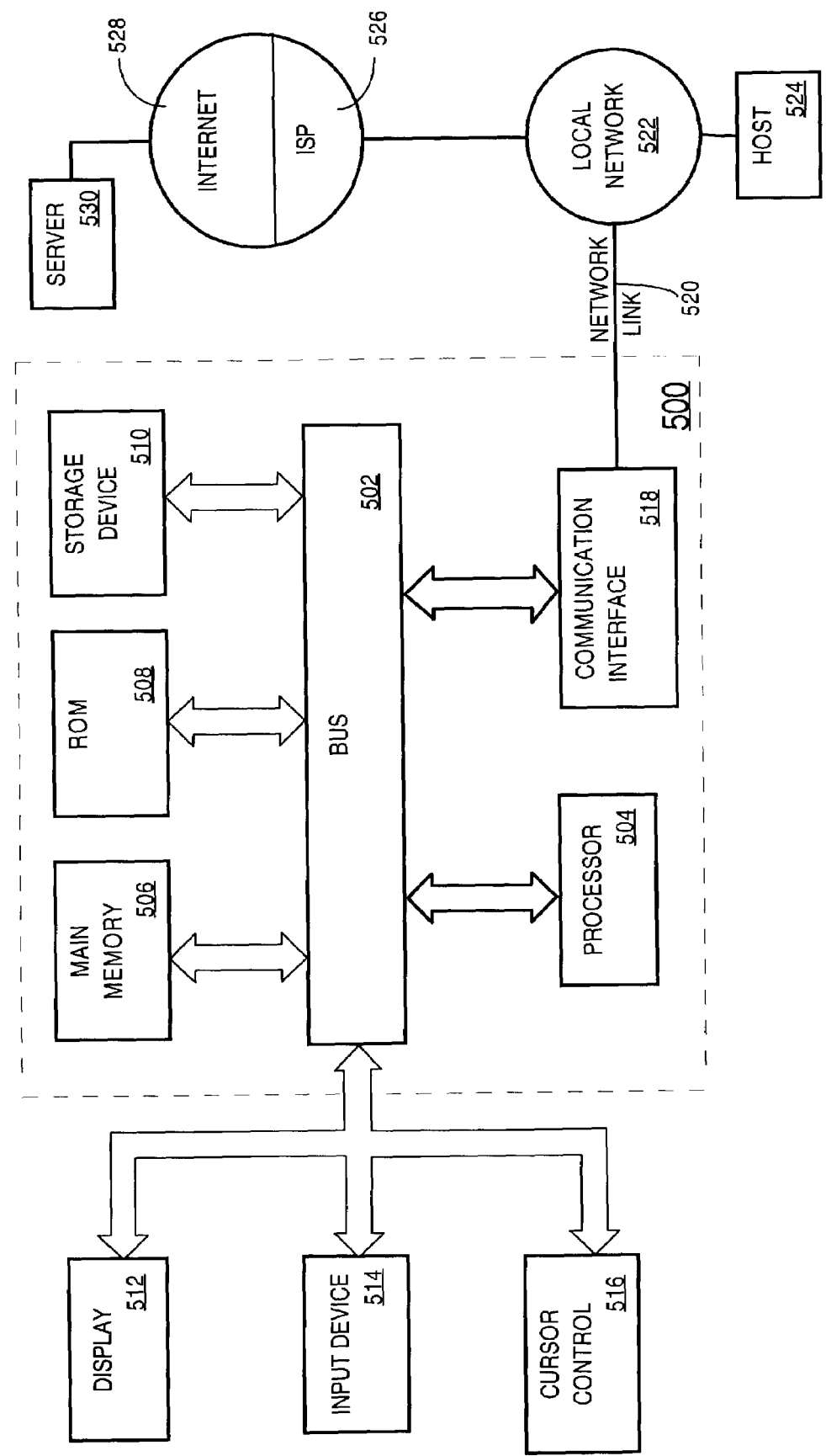
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for preventing spoofing of network addresses. According to one embodiment of the invention, network address spoofing prevention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for preventing spoofing of network addresses as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing spoofing of network addresses, the method comprising the computer-implemented steps of:
    establishing one or more bindings outside an Address Resolution Protocol (ARP) table, wherein each of the one or more bindings is between an Internet Protocol (IP) address, a Media Access Control (MAC) address, and a port identifier, and wherein said IP address and said MAC address identify a device that is the only device physically connected to a port of a second device which port is identified by said port identifier;
    determining whether there is a particular binding among the one or more bindings,
        wherein said particular binding is between a first IP address, a first MAC address, and a first port identifier,
        wherein said first IP address and said first MAC address identify a first device that is the only device connected to a particular port of said second device which particular port is identified by said first port identifier,
        wherein at least one of (i) that said first IP address is different from a second IP address, (ii) that said first MAC address is different from a second MAC address, or (iii) that said first port identifier is different from a second port identifier, is true,
        wherein at least one of (i) that said first IP address is same as said second IP address, (ii) that said first MAC address is same as said second MAC address, or (iii) that said first port identifier is same as said second port identifier, is true, and
        wherein said second IP address, said second MAC address, and said second port identifier comprise a claim for a binding relationship therebetween;
    in response to determining that there is said particular binding among the one or more bindings, determining that said particular port of said second device is under attack; and
    updating said ARP table in memory based on said particular binding.

2. A method as recited in claim 1,
    wherein said first Internet Protocol (IP) address and said first Media Access Control (MAC) address are identified by an Address Resolution Protocol (ARP) message received through said particular port identified by said first port identifier.

3. A method as recited in claim 1, further comprising the computer-implemented step of:
    generating a notification upon determining that said particular port of said second device is under attack.

4. A method as recited in claim 3, further comprising the computer-implemented step of:
    sending a warning to said particular port.

5. A method as recited in claim 3, further comprising the computer-implemented step of:
    sending said notification to said particular port identified by said first port identifier that is included in said binding that includes said first IP address or said first MAC address.

6. A method as recited in claim 1, further comprising the computer-implemented step of:

interrupting communication from a second port identified by said second port identifier upon determining that said particular port of said second device is under attack.

7. A method as recited in claim 1, further comprising the computer-implemented step of:
assigning, upon determining that said particular port of said second device is under attack, a new IP address to said first device that is connected to said particular port, wherein said new IP address differs from said first IP address.

8. A method as recited in claim 1, further comprising updating said ARP table linked to said second device with the one or more bindings in a specified frequency.

9. A method as recited in claim 8, wherein said frequency is based on a volume of network traffic.

10. A method as recited in claim 1, further comprising updating said ARP table linked to said second device with the one or more bindings in response to receiving an ARP packet.

11. A method as recited in claim 1, wherein the step of establishing one or more bindings further comprises receiving said IP address, said MAC address and said port identifier in a Dynamic Host Configuration Protocol (DHCP) request.

12. An apparatus for preventing spoofing of network addresses, comprising:
means for establishing one or more bindings outside an Address Resolution Protocol (ARP) table, wherein each of the one or more bindings is between an Internet Protocol (IP) address, a Media Access Control (MAC) address, and a port identifier, and wherein said IP address and said MAC address identify a device that is the only device physically connected to a port of a second device which port is identified by said port identifier;
means for determining whether there is a particular binding among the one or more bindings,
wherein said particular binding is between a first IP address, a first MAC address, and a first port identifier,
wherein said first IP address and said first MAC address identify a first device that is the only device connected to a particular port of said second device which particular port is identified by said first port identifier,
wherein at least one of (i) that said first IP address is different from a second IP address, (ii) that said first MAC address is different from a second MAC address, or (iii) that said first port identifier is different from a second port identifier, is true,
wherein at least one of (i) that said first IP address is same as said second IP address, (ii) that said first MAC address is same as said second MAC address, or (iii) that said first port identifier is same as said second port identifier, is true, and
wherein said second IP address, said second MAC address, and said second port identifier comprise a claim for a binding relationship therebetween;
means for determining that said particular port of said second device is under attack, in response to determining that there is a particular binding among the one or more bindings; and
means for updating said ARP table in memory based on said particular binding.

13. An apparatus as recited in claim 12, wherein said first Internet Protocol (IP) address and said first Media Access Control (MAC) address are identified by an Address Resolution Protocol (ARP) message received through said particular port identified by said first port identifier.

14. An apparatus as recited in claim 12, further comprising:
means for assigning, upon determining that said particular port of said second device is under attack, a new IP address to said first device that is connected to said particular port, wherein said new IP address differs from said first IP address.

15. An apparatus for preventing spoofing of network addresses, comprising:
a network interface that is coupled to a data network for receiving one or more packet flows therefrom;
a processor; and
one or more stored sequences of instructions which, when executed by the processor, cause the processor to carry out the steps of:
establishing one or more bindings outside an Address Resolution Protocol (ARP) table, wherein each of the one or more bindings is between an Internet Protocol (IP) address, a Media Access Control (MAC) address, and a port identifier, and wherein said IP address and said MAC address identify a device that is the only device physically connected to a port of a second device which port is identified by said port identifier;
determining whether there is a particular binding among the one or more bindings,
wherein said particular binding is between a first IP address, a first MAC address, and a first port identifier,
wherein said first IP address and said first MAC address identify a first device that is the only device connected to a particular port of said second device which particular port is identified by said first port identifier,
wherein at least one of (i) that said first IP address is different from a second IP address, (ii) that said first MAC address is different from a second MAC address, or (iii) that said first port identifier is different from a second port identifier, is true,
wherein at least one of (i) that said first IP address is same as said second IP address, (ii) that said first MAC address is same as said second MAC address, or (iii) that said first port identifier is same as said second port identifier, is true, and
wherein said second IP address, said second MAC address, and said second port identifier comprise a claim for a binding relationship therebetween;
in response to determining that there is said particular binding among the one or more bindings, determining that said particular port of said second device is under attack; and
updating said ARP table in memory based on said particular binding.

16. An apparatus as recited in claim 15,
wherein said first Internet Protocol (IP) address and said first Media Access Control (MAC) address are identified by an Address Resolution Protocol (ARP) message received through said particular port identified by said first port identifier.

17. An apparatus as recited in claim 15, wherein the one or more stored sequences of instructions which, when executed by the processor, cause the processor to further carry out the step of:

assigning, upon determining that said particular port of said second device is under attack, a new IP address to said first device that is connected to said particular port, wherein said new IP address differs from said first IP address.

18. An apparatus as recited in claim 15, further comprising the step of:

generating a notification upon determining that said particular port of said second device is under attack.

19. An apparatus as recited in claim 18, further comprising the step of:

sending a warning to said particular port.

20. An apparatus as recited in claim 18, further comprising the step of:

sending said notification to said particular port identified by said first port identifier that is included in said binding that includes said first IP address or said first MAC address.

21. An apparatus as recited in claim 15, further comprising the step of:

interrupting communication from a second port identified by said second port identifier upon determining that said particular port of said second device is under attack.

22. An apparatus as recited in claim 15, further comprising the step of updating said ARP table linked to said second device with the one or more bindings in a specified frequency.

23. An apparatus as recited in claim 22, wherein said frequency is based on a volume of network traffic.

24. An apparatus as recited in claim 15, further comprising the step of updating said ARP table linked to said second device with the one or more bindings in response to receiving an ARP packet.

25. An apparatus as recited in claim 15, wherein the step of establishing one or more bindings further comprises receiving said IP address, said MAC address and said port identifier in a Dynamic Host Configuration Protocol (DHCP) request.

26. A computer-readable medium carrying one or more sequences of instructions for preventing spoofing of network addresses, which instructions, when executed by one or more processors, cause the one or more processors to carry out the steps of:

establishing one or more bindings outside an Address Resolution Protocol (ARP) table, wherein each of the one or more bindings is between an Internet Protocol (IP) address, a Media Access Control (MAC) address, and a port identifier, and wherein said IP address and said MAC address identify a device that is the only device physically connected to a port of a second device which port is identified by said port identifier;

determining whether there is a particular binding among the one or more bindings, wherein said particular binding is between a first IP address, a first MAC address, and a first port identifier, wherein said first IP address and said first MAC address identify a first device that is the only device connected to a particular port of said second device which particular port is identified by said first port identifier, wherein at least one of (i) that said first IP address is different from a second IP address, (ii) that said first MAC address is different from a second MAC address, or (iii) that said first port identifier is different from a second port identifier, is true, wherein at least one of (i) that said first IP address is same as said second IP address, (ii) that said first MAC address is same as said second MAC address, or (iii) that said first port identifier is same as said second port identifier, is true, and wherein said second IP address, said second MAC address, and said second port identifier comprise a claim for a binding relationship therebetween;

in response to determining that there is said particular binding among the one or more bindings, determining that said particular port of said second device is under attack; and updating said ARP table in memory based on said particular binding.

* * * * *